(12) United States Patent
Johnson et al.

(10) Patent No.: US 12,464,970 B2
(45) Date of Patent: Nov. 11, 2025

(54) WORK VEHICLE GUIDANCE AND/OR AUTOMATION WITH RESPECT TO IDENTIFIED REGIONS OF INTEREST IN A WORK AREA

(71) Applicant: Deere & Company, Moline, IL (US)

(72) Inventors: David A. Johnson, Durham, NC (US); Matthew D. Hansen, Urbandale, IA (US); Ajit K. Thankappan Pillai, West Des Moines, IA (US); Michael A. Torzewski, Waukee, IA (US)

(73) Assignee: Deere & Company, Moline, IL (US)

( * ) Notice: Subject to any disclaimer, the term of this patent is extended or adjusted under 35 U.S.C. 154(b) by 173 days.

(21) Appl. No.: 18/361,343

(22) Filed: Jul. 28, 2023

(65) Prior Publication Data

US 2025/0031602 A1    Jan. 30, 2025

(51) Int. Cl.
*A01B 79/00*    (2006.01)
*A01B 69/04*    (2006.01)

(52) U.S. Cl.
CPC .......... *A01B 79/005* (2013.01); *A01B 69/008* (2013.01)

(58) Field of Classification Search
None
See application file for complete search history.

(56) References Cited

U.S. PATENT DOCUMENTS

| | | | |
|---|---|---|---|
| 7,612,668 B2 | 11/2009 | Harvey | |
| 7,689,354 B2 | 3/2010 | Heiniger et al. | |
| 7,747,370 B2 | 6/2010 | Dix | |
| 8,996,171 B2 | 3/2015 | Anderson et al. | |
| 10,143,126 B2 | 12/2018 | Foster et al. | |
| 10,251,329 B2 | 4/2019 | Foster et al. | |
| 11,052,943 B2 | 7/2021 | Bunderson et al. | |
| 2015/0348419 A1* | 12/2015 | Matthews | G08G 1/20 701/117 |
| 2017/0354078 A1 | 12/2017 | Foster et al. | |
| 2018/0321683 A1 | 11/2018 | Foster et al. | |
| 2019/0353483 A1 | 11/2019 | Liu et al. | |
| 2022/0034859 A1* | 2/2022 | Rupp | A01C 7/04 |
| 2022/0397906 A1* | 12/2022 | Sneyders | G05D 1/0214 |
| 2023/0255132 A1* | 8/2023 | Nadke | G05D 1/0278 701/50 |
| 2024/0016074 A1* | 1/2024 | Nishii | G05D 1/617 |

* cited by examiner

*Primary Examiner* — Tamara L Weber
(74) *Attorney, Agent, or Firm* — Gary Montle; Lucian Wayne Beavers; Patterson Intellectual Property Law, PC

(57) ABSTRACT

Computer-implemented systems and methods are provided for automatically conforming guidance of work vehicles to detected conditions in a work area. Upon determining a deviation of a work vehicle's current movement path from a first planned movement path with respect to the work area, at least a portion of the work area may be identified as a region of interest, along with coverage characteristics associated with the region of interest, based at least in part on the determined deviation. A second planned movement path is generated for the work vehicle and/or another work vehicle subsequently traversing the work area relative to the region of interest, wherein the generated second planned movement path accounts for the coverage characteristics associated with the region of interest. The second planned movement path may be generated to avoid the region, prevent turns within the region, optimize work vehicle operation within the work area generally, etc.

20 Claims, 15 Drawing Sheets

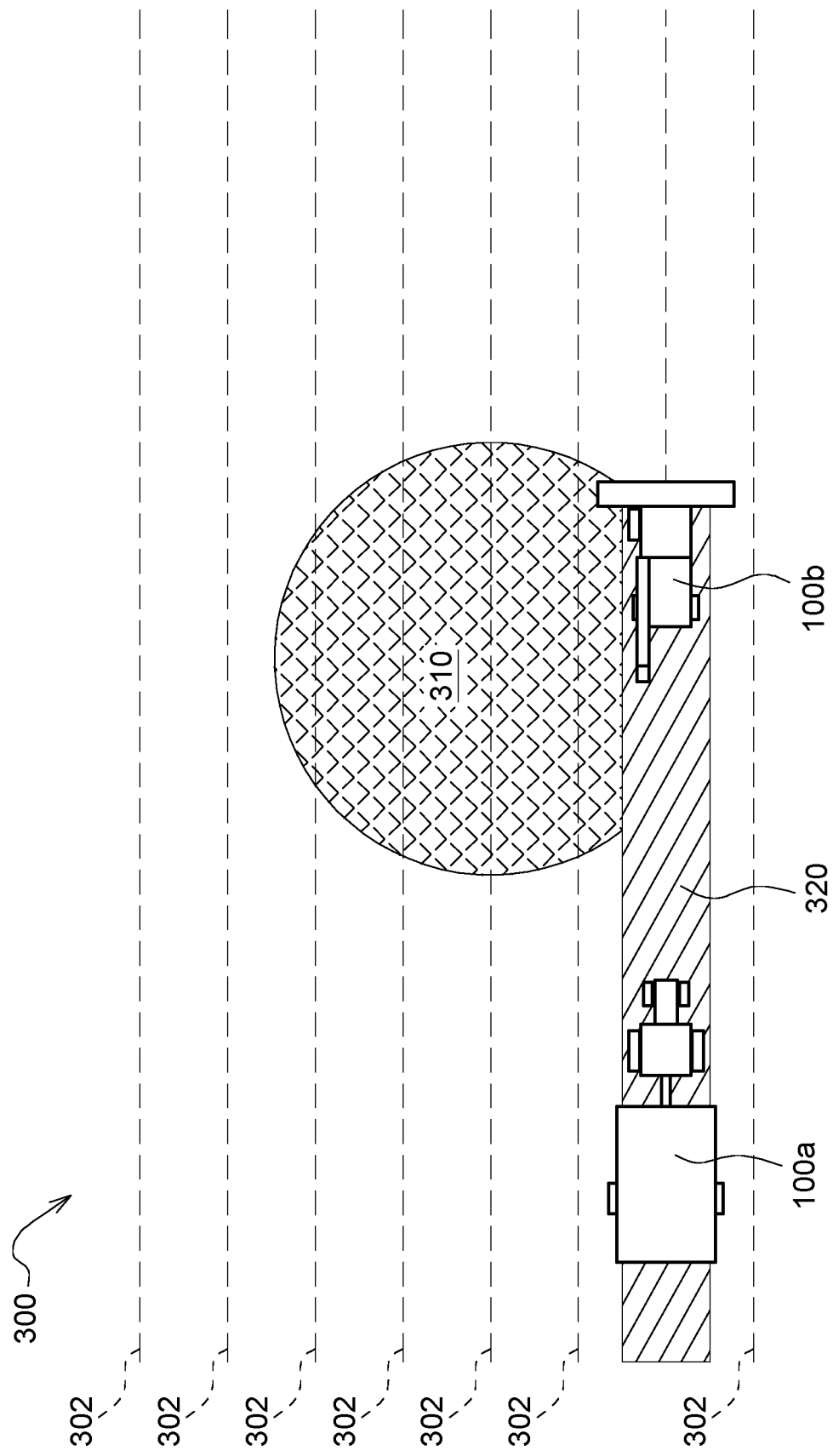

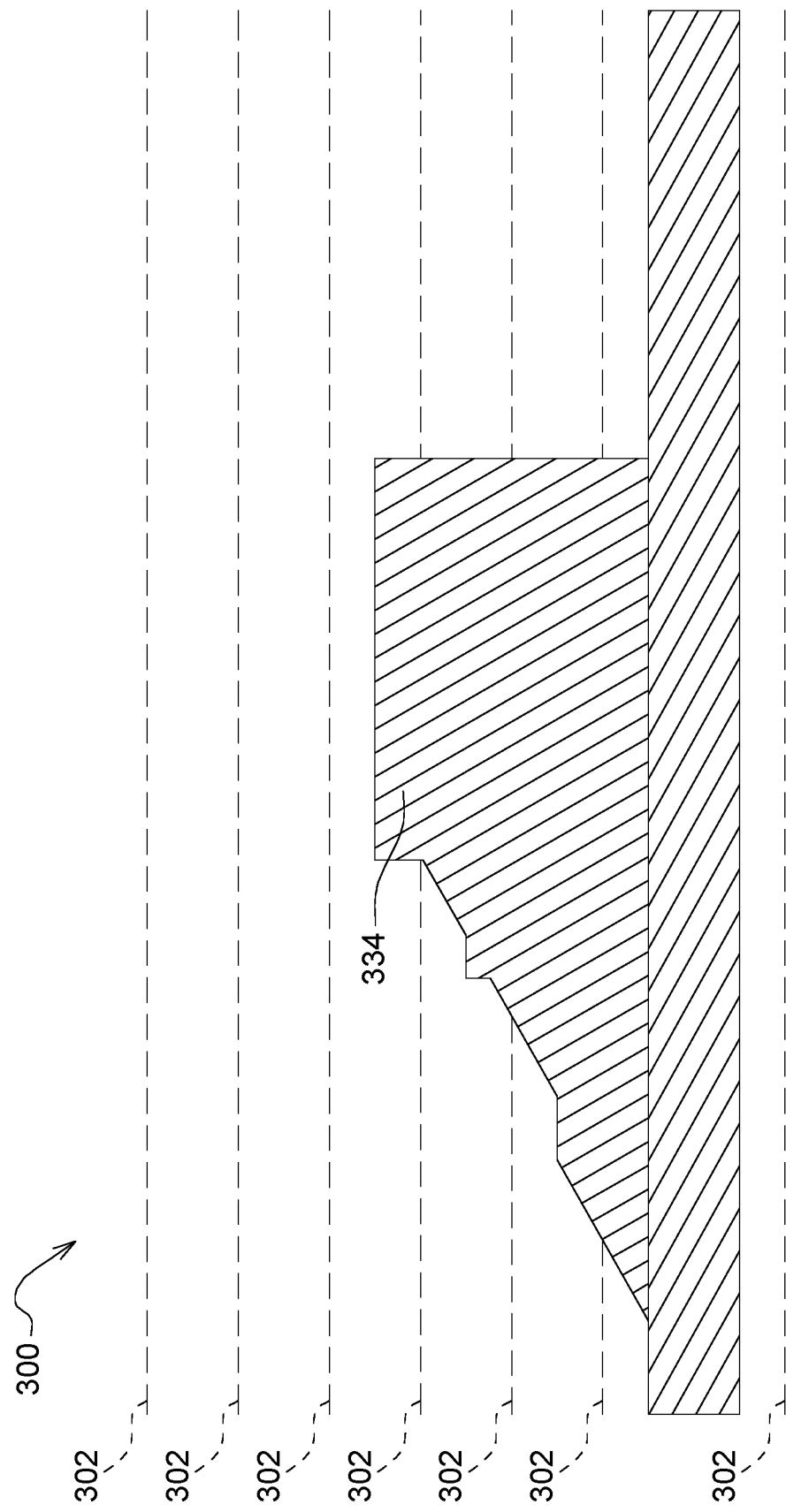

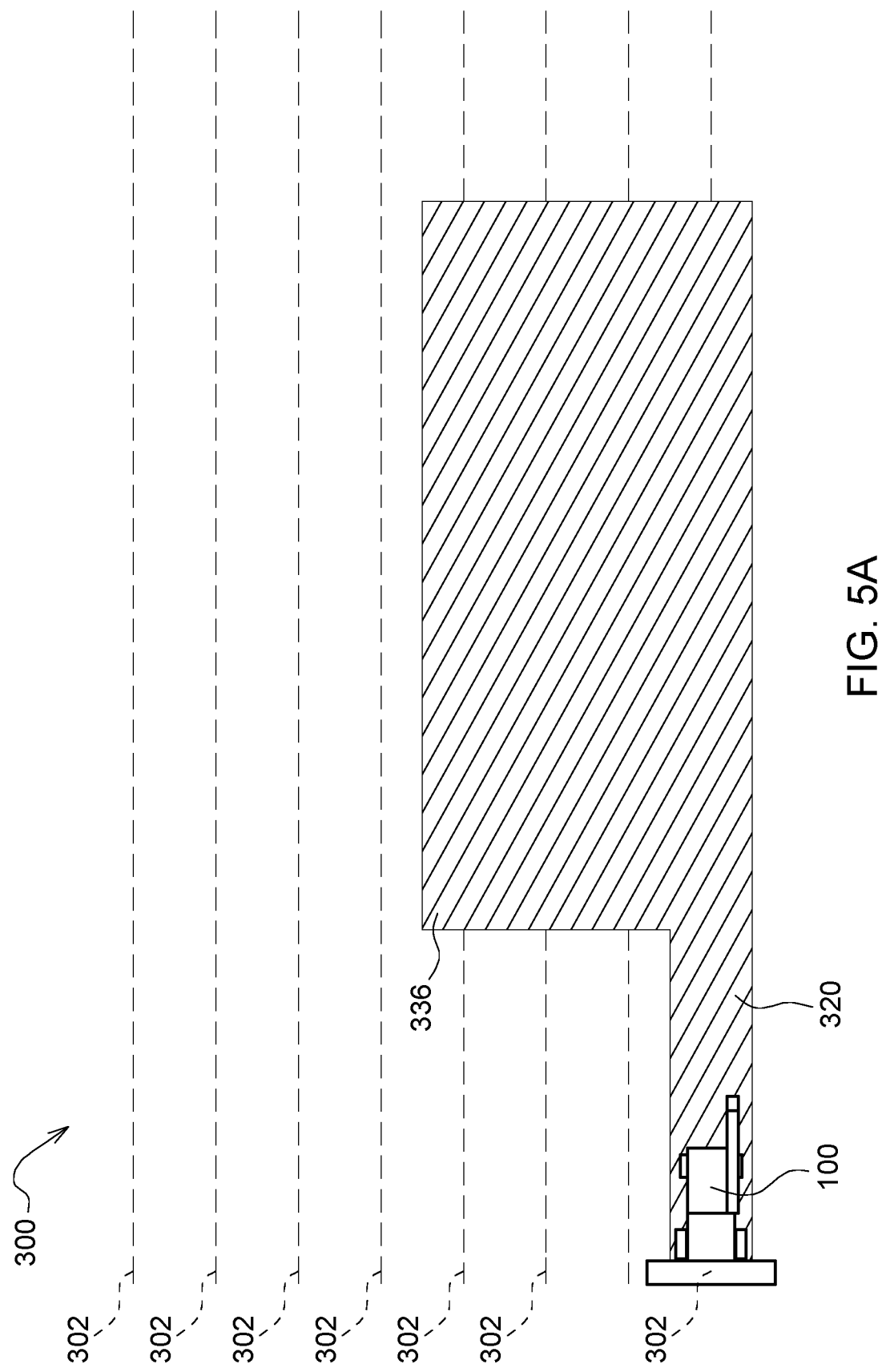

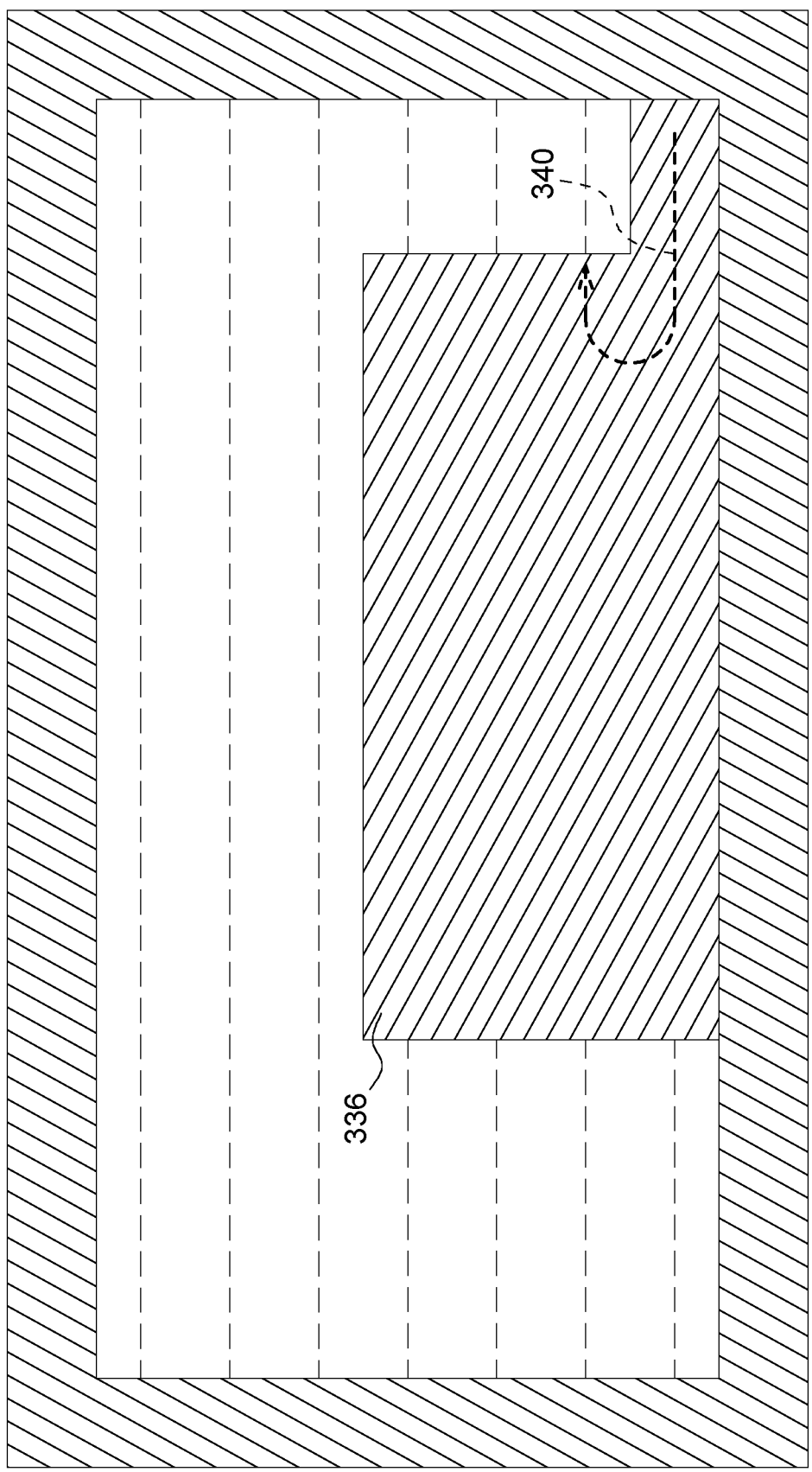

WORK VEHICLE GUIDANCE AND/OR AUTOMATION WITH RESPECT TO IDENTIFIED REGIONS OF INTEREST IN A WORK AREA

FIELD OF THE DISCLOSURE

The present disclosure relates generally to a method and system for path planning, as well as operator guidance and/or automation of a work vehicle with respect to portions of a work area, based for example on observed deviations during operation from a predetermined guidance plan.

BACKGROUND

A path planner may be used to determine one or more path plans for a self-propelled work vehicle to cover a work area. The work area may for example represent a field for growing a crop or other vegetation. The work vehicle may need to traverse the entire work area or a portion thereof to plant a crop, to treat a crop, to harvest a crop, or to perform another task associated with the crop or vegetation, to name non-limiting examples.

Conventional guidance systems are known to allow operators to navigate end turns that are defined by guidance line and boundary information. However, the conventional tools lack appropriate tools for properly determining how guidance should be altered or otherwise how turns may be triggered in response to various field scenarios that may arise.

In one example, expanding the application of conventional guidance systems from tractors to combines may foreseeably introduce certain logistical challenges. Combines are less likely to be utilized in association with boundaries and headlands, and therefore turns need to be generated based on recorded coverage. Combines also typically harvest in a spiral pattern per region of a field, so a U-turn path with alternating right and left turns may be insufficient for most purposes. Features seeking to address these challenges tend to reveal additional challenges, such as a systemic lack of understanding regarding the context for the coverage being observed. This may include the unmet need to properly identify coverage from waterways, or coverage around a field-internal unloading area within which turns are undesirable. Another unmet need may be properly identifying field staging area coverage or coverage around a field-internal wet spot which should be traversed.

It would accordingly be desirable to programmatically recognize and classify temporary environmental conditions based on monitored movements of a work vehicle (e.g., wet spots, waterways, tendering areas, staging areas, etc.).

It would further be desirable to trigger or otherwise plan for appropriate actions when a current path for a work vehicle intersects, or is predicted to intersect, a region of interest such as for example previously recorded coverage.

BRIEF SUMMARY

The current disclosure provides an enhancement to conventional systems, at least in part by introducing a novel system and method for proactively identifying regions of interest in a work area based at least in part on monitored work vehicle movement relative to a planned path therefor, and further triggering appropriate actions and/or adjusting the planned path for the work vehicle (and/or other work vehicles). Such systems and methods may include user interface enhancements to allow associated users, including but not limited to work vehicle operators, to understand and modify system behavior. Such systems and methods may include the use of enhanced guidance and control features, such as for example braking in turns based on a determined region of interest and characteristics of the work vehicle and/or region of interest. Such systems and methods may include for example smart turn patterns for support of multiple work vehicles, such as for coordinating and optimizing the performance of multiple work vehicles traversing a common work area.

According to a first embodiment as disclosed herein, a computer-implemented method is provided for automatically conforming guidance of work vehicles to detected conditions in a work area. Upon determining a deviation of a current movement path of a work vehicle from a first planned movement path of the work vehicle with respect to the work area, at least a portion of the work area is identified as a region of interest, along with one or more coverage characteristics associated with the region of interest, based at least in part on the determined deviation. A second planned movement path is generated for the work vehicle and/or another work vehicle subsequently traversing the work area relative to the region of interest, wherein the generated second planned movement path accounts for the one or more coverage characteristics associated with the region of interest.

In one exemplary aspect according to the above-referenced first embodiment, the one or more coverage characteristics may comprise a persistence status associated with the region of interest, wherein the generating of the second planned movement path may comprise altering or maintaining the first planned movement path with respect to part or all of the region of interest based on the persistence status. The persistence status may for example be determined based at least in part on previously monitored traverse of the region of interest as distinguished from the determined deviation of the current movement path, and further based at least in part on user input received via a user interface subsequent to the determined deviation.

In another exemplary aspect according to this embodiment and optionally other above-referenced aspects, the second planned movement path may be generated to guide the respective work vehicle with respect to one or more of: avoiding further traverse with respect to the region of interest; avoiding further traverse with respect to monitored work vehicle coverage of the work area; optimizing work vehicle turns in view of turning capabilities for a type of work vehicle and a remaining coverage of the work area; avoiding turns within the region of interest; and/or parallel traverse with respect to previous movement paths about or through the region of interest.

In another exemplary aspect according to this embodiment and optionally other above-referenced aspects, the region of interest and/or the one or more coverage characteristics may be identified further based at least in part on one or more previously monitored movement paths relative to the at least portion of the work area.

In another exemplary aspect according to this embodiment and optionally other above-referenced aspects, wherein the region of interest and/or the one or more coverage characteristics may be identified further based at least in part on user input received via a user interface subsequent to the determined deviation.

According to a second embodiment as disclosed herein, a system is provided for automatically conforming guidance of work vehicles to detected conditions in a work area, which includes one or more processors configured to direct the performance of steps according to the above-referenced first embodiment and optionally any one or more of the exemplary aspects thereof. The one or more processors may reside in a remote (i.e., cloud computing) arrangement, on one or more work vehicles traversing the work area, or some combination thereof.

According to a third embodiment as disclosed herein, a self-propelled work vehicle is provided with one or more sensors configured to generate output signals representing a current movement path of the work vehicle, and one or more processors configured to direct the performance of steps according to the above-referenced first embodiment and optionally any one or more of the exemplary aspects thereof. At least one of the one or more processors may for example be associated with a vehicle controller.

Numerous objects, features and advantages of the embodiments set forth herein will be readily apparent to those skilled in the art upon reading of the following disclosure when taken in conjunction with the accompanying drawings.

BRIEF DESCRIPTION OF THE DRAWINGS

FIGS. 4A to 4D are graphical diagrams representing an exemplary tendering scenario wherein a region of interest is an unloading portion of the work area being negotiated by one or more work vehicles.

FIGS. 5A to 5E are graphical diagrams representing an exemplary scenario wherein a region of interest is a staging portion of the work area.

DETAILED DESCRIPTION

The implementations disclosed in the above drawings and the following detailed description are not intended to be exhaustive or to limit the present disclosure to these implementations. Any alterations and further modifications to the described devices, systems, methods, and any further application of the principles of the present disclosure are fully contemplated as would normally occur to one skilled in the art to which the disclosure relates. In particular, it is fully contemplated that the features, components, steps, or a combination thereof described with respect to one example may be combined with the features, components, steps, or a combination thereof described with respect to other examples of the present disclosure.

Although not shown in the accompanying drawings, a system as disclosed herein may include one or more processors, such as for example implemented in servers (e.g., host data center), alone or in a networked arrangement such as in a cloud computing environment, and configured to direct the performance of operations such as for example steps in a method as further described below. The one or more processors are communicatively linked to one or more work vehicles 100, and may be further linked to one or more remote user computing devices, for example via respective communications networks which may be the same or different in configuration. The system may in some embodiments include vehicle controllers associated with one or more of the work vehicles 100 or computer program products residing thereon, and/or one or more of the remote user computing devices or computer program products residing thereon, and/or may merely comprise the one or more servers.

A work vehicle 100 for the purpose of the present disclosure may be a machine that travels, self-propelled or otherwise, through a work area such as for example an agricultural field, and may include a combine harvester, tractor, sprayer, or the like.

Figure 1:
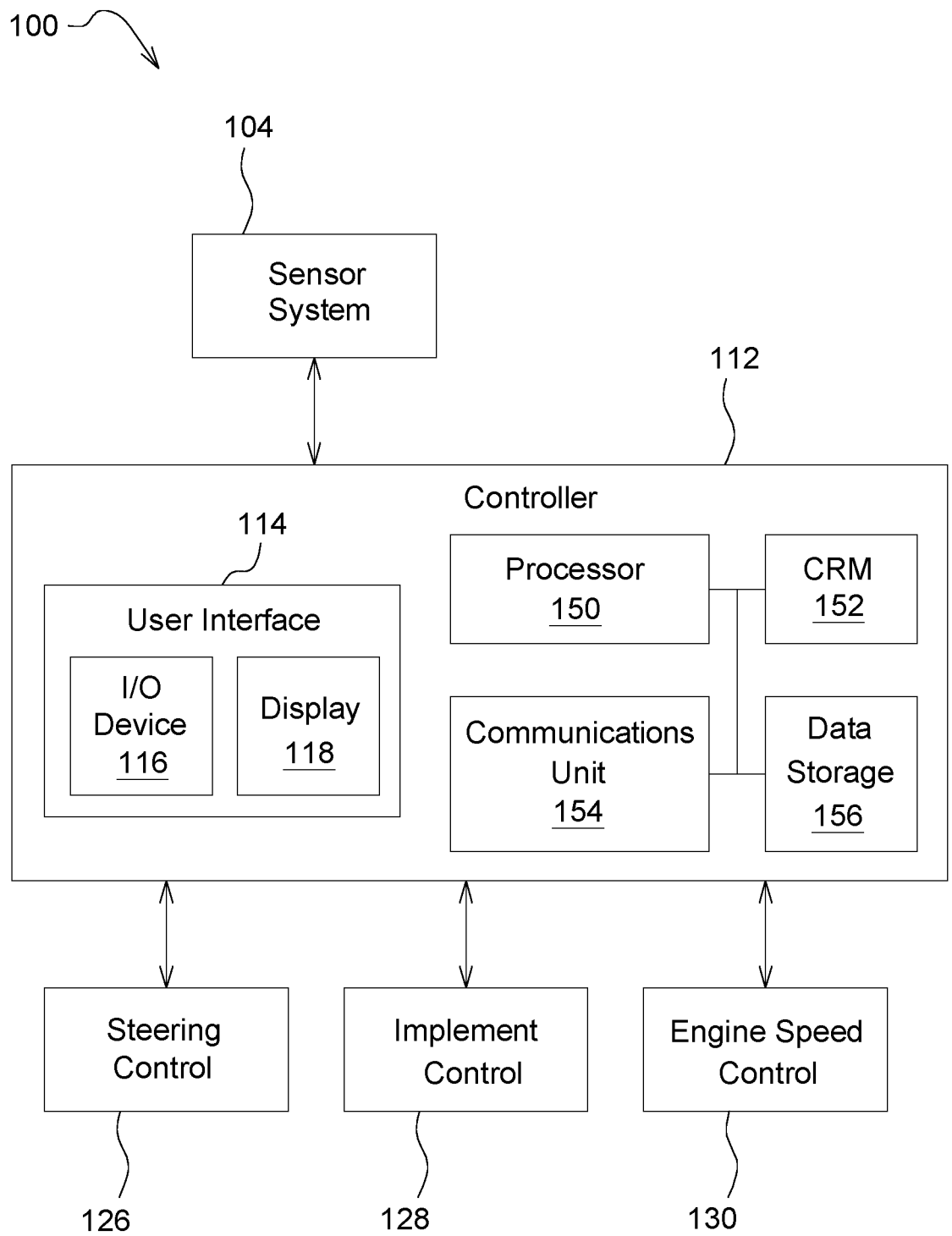
FIG. 1 is a block diagram representing a work vehicle control system according to an embodiment of the present disclosure.

FIG. 1 in a particular embodiment as disclosed herein shows a system associated with a work vehicle 100 for planning, guidance, and/or control of the path of the work vehicle 100 while traversing a work area. The system of FIG. 1 includes a sensor system 104 coupled or otherwise functionally linked to a vehicle controller 112 including a user interface 114. In turn, the vehicle controller 112 may have integrated therein or otherwise communicate with a steering control unit 126, an implement control unit 128, and/or an engine speed control unit 130. Such control units and respective functions, among others, may be discrete in nature or otherwise combined in various embodiments without departing in any way from the scope of the present disclosure.

The vehicle controller 112 may generate output signals corresponding to display and/or automatic control of various operations of the work vehicle 100 consistent with a generated path plan, which may be an initial path plan or a revised path as discussed further herein for example with respect to a classified region of interest within or otherwise associated with the work area. The vehicle controller 112 may generate control signals for any or all of the steering control unit 126, the implement control unit 128, and/or the engine speed control unit 130, and/or any other component or system that is/are consistent with tracking a vehicle path and subject to modification or interruption by the system 100 or another system. For example, control signals may comprise a steering control signal or data message that defines a steering angle of the steering shaft, a braking control signal or data message that defines the amount of deceleration, hydraulic pressure, or braking friction to the applied to brakes, a propulsion control signal or data message that controls a throttle setting, a fuel flow, a fuel injection system, vehicular speed, or vehicular acceleration. Further, where the vehicle 100 may be propelled by an electric drive or electric motor, the propulsion control signal may control or modulate electrical energy, electrical current, electrical voltage provided to an electric drive or motor. The control signals generally vary with time as necessary to track the path plan. The lines that interconnect the components of the system may comprise logical communication paths, physical communication paths, or both. Logical communication paths may comprise communications or links between software modules, instructions or data, whereas physical communication paths may comprise transmission lines, data buses, or communication channels, to name non-limiting examples.

The steering control unit 126 may comprise or otherwise interact with an electrically controlled hydraulic steering system, an electrically driven rack and pinion steering, an Ackerman steering system, or another steering system. The engine speed control unit 130 may comprise or otherwise interact with an internal combustion engine, an internal combustion engine-electric hybrid system, an electric drive system, or the like.

The sensor system 104 may for example comprise components of a navigation system and/or position determining system which individually or collectively include one or more of global positioning system (GPS) sensors, vehicle speed sensors, ultrasonic sensors, laser scanners, radar wave transmitters and receivers, thermal sensors, imaging devices, structured light sensors, and other optical sensors, wherein exemplary imaging devices may include a digital (CCD/CMOS) camera, an infrared camera, a stereoscopic camera, a time-of-flight/depth sensing camera, high resolution light detection and ranging (LiDAR) scanners, radar detectors, laser scanners, and the like within the scope of the present disclosure. In various embodiments the sensor system 104 may include sensors located on other work vehicle operating in the same work area, input values from such sensors, user inputs from a user interface 114 associated with the work vehicle 100 as further discussed below, and the like.

The vehicle controller 112 may be configured to produce outputs, as further described below, to a user interface 114 associated with a display unit 118 for display to the human operator. The vehicle controller 112 may be configured additionally or in the alternative to produce outputs to a display unit independent of the user interface 114 such as for example a mobile device associated with the operator or a remote display unit independent of the work vehicle 100. The vehicle controller 112 may be configured to receive inputs from the user interface 114, such as user input provided via the user interface 114. Not specifically represented in FIG. 1, the vehicle controller 112 may in some embodiments further receive inputs from remote devices associated with a user via a respective user interface, for example a display unit with touchscreen interface. Data transmission between for example the vehicle controller 112 and a remote user interface may take the form of a wireless communications system and associated components as are conventionally known in the art. In certain embodiments, a remote user interface and vehicle control systems for respective work vehicles may be further coordinated or otherwise interact with a remote server or other computing device for the performance of operations in a system as disclosed herein.

The vehicle controller 112 may for example include or be associated with a processor 150, a computer readable medium 152, a communication unit 154, data storage 156 such as for example may include a database network, and the aforementioned user interface 114 (for example as part of an onboard vehicle control panel or otherwise discretely disposed) having a display 118. An input/output device 116, such as a keyboard, joystick, touch screen, or other user interface tool, may be provided so that the human operator may input instructions to the vehicle controller 112. It may be understood that the vehicle controller 112 described herein may be a single controller having all of the described functionality, or it may include multiple controllers wherein the described functionality is distributed among the multiple controllers.

Various operations, steps or algorithms as described in connection with the vehicle controller 112 can be embodied directly in hardware, in a computer program product such as a software module executed by the processor 150, or in a combination of the two. The computer program product can reside in RAM memory, flash memory, ROM memory, EPROM memory, EEPROM memory, registers, hard disk, a removable disk, or any other form of computer-readable medium 152 known in the art. An exemplary computer-readable medium can be coupled to the processor such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" 150 as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The communication unit 154 may support or provide communications between the controller and external systems or devices, and/or support or provide communication interface with respect to internal components of the work vehicle 102. The communications unit may include wireless communication system components (e.g., via cellular modem, WiFi, Bluetooth or the like) and/or may include one or more wired communications terminals such as universal serial bus ports.

The data storage 156 in an embodiment may for example be configured to receive and store real-time and/or historical data sets regarding work vehicle characteristics, kinetics, position, and the like, and/or generated plans including assigned turn types, work area/field boundary parameters, and the like in selectively retrievable form, for example as inputs for developing models as may be used for generating plans based on future input data sets. Data storage as discussed herein may, unless otherwise stated, generally encompass hardware such as volatile or non-volatile storage devices, drives, memory, or other storage media, as well as one or more databases residing thereon.

Figure 2:
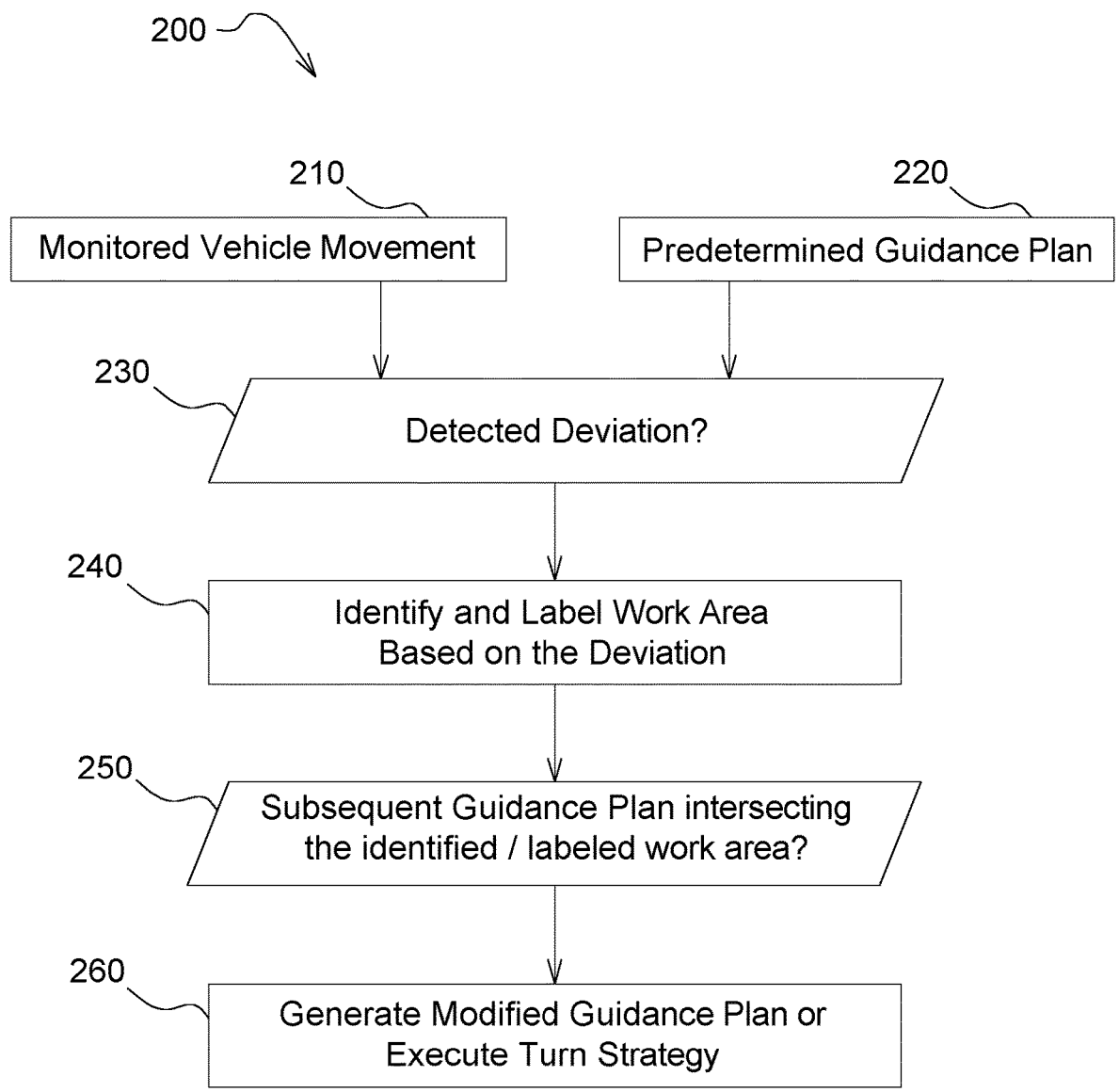
FIG. 2 is a flowchart representing an exemplary method according to an embodiment of the present disclosure.

Referring to FIG. 2, with further reference to FIGS. 3-5 for illustrative purposes, a method 200 of planning, implementing, and dynamically altering work vehicle paths for one or more work vehicles 100 with respect to a work area 300 may next be described.

The method 200 may include monitoring of work vehicle movement (step 210) through a work area 300, and further comparing this movement or otherwise corresponding positions of the work vehicle to a planned movement path (step 220), which may for example be predetermined and stored in data storage on the work vehicle or otherwise in functional communication with the controller thereof. Through this comparison, the method 200 may further include detecting any deviations (step 230) between the current movement path (e.g., actual corresponding positions of the work vehicle) and the planned movement path (e.g., expected or predicted corresponding positions of the work vehicle).

Data associated with a work area 300 may be predetermined and uploaded or otherwise obtained from a remote data source prior to or otherwise in association with a work operation. In an embodiment, an initial map associated with the work area may be provided and capable of dynamic alteration by an operator or other authorized user to define boundaries, contours, or other relevant parameters of the work area, wherein such alterations may at least be locally and temporarily saved by the vehicle controller 112 for application in association with methods as further described herein. Likewise, a planned vehicle path may be predetermined and uploaded or otherwise obtained from a remote data source prior to or otherwise in association with a work operation, and mapped with respect to the work area itself.

The planned vehicle path may be generated manually by a user or otherwise capable of being dynamically altered by the user, wherein an initial planned vehicle path may become a current planned vehicle path.

Conventional examples of a work area 300 and a planned vehicle path may include exterior field boundaries and interior field boundaries, any of which may for example be defined as passable or non-passable, and may further include headland boundaries or regions as offsets with respect thereto.

In carrying out a step 210 of monitoring, determining, and/or predicting a current work vehicle path, a processor may obtain, for example by retrieving from data storage 156 or receiving from a sensor system 104, values for work vehicle characteristics, work vehicle kinetics, work vehicle position/location/orientation, and the like. Work vehicle characteristics may include structural characteristics defining capabilities of the work vehicle 100 such as for example a minimum turn radius, a wheel angle rate, and the like. Such characteristics may be permanent in nature based on the structure of the work vehicle 100, or may be dependent at least in part on a configuration of the work vehicle 100 which is not permanent but based on a type of implement mounted thereupon, a type of work being performed, etc. Work vehicle kinetics may for example include an advance speed of the work vehicle 100 as well as potentially any kinetics associated with implements associated with the work vehicle 100. A system may further monitor or otherwise consider work conditions such as for example a terrain or other features being worked by the work vehicle 100, weather conditions, or the like.

In carrying out step 210, the system may in some embodiments need to map or otherwise convert data from the sensor system 104, or other inputs corresponding to a determined current vehicle path, into a reference coordinate frame associated with the work area and/or planned vehicle path.

Upon detecting or otherwise determining a deviation in the current movement path from a planned movement path, the method 200 may include a step 240 for identifying and labeling or otherwise classifying at least a portion of the work area 300 as what for illustrative purposes herein may be referred to as a region of interest 330, 332, 334, 336, along with one or more coverage characteristics in various embodiments as will be further described below, based at least in part on the determined deviation.

In various embodiments, the one or more coverage characteristics associated with the region of interest are accounted for in subsequently modifying the planned movement path for the work vehicle 100, and/or other work vehicles traversing the work area 300.

In an embodiment, modifying of the planned movement path may take place or at least contemplated immediately upon identifying the region of interest, wherein the decision to modify the planned movement path and/or the configuration of the planned movement path may be dependent at least in part on the one or more coverage characteristics.

In another embodiment the method 200 may, rather than immediately modifying the current planned movement path, monitor activity of the work vehicle(s) 100 traversing the work area 300 and determine or predict whether a planned movement path for such work vehicle(s) will subsequently traverse the region of interest (step 250). In such an event, the method 200 may (in step 260) then further generate a modified planned movement path, or execute a turn strategy for the work vehicle(s) with respect to the region of interest while otherwise substantially maintaining the planned movement path, wherein the strategy may be dependent at least in part on the one or more coverage characteristics.

In various embodiments, generation of a modified planned movement path may for example be performed based upon one or more specified quality metrics using executed optimization routines and corresponding models which may be predetermined or developed over time, extracted from data storage based on dynamic input data sets, and the like. Quality metrics may be specified for a given work area 300, predetermined for a type of work vehicle or work operation, and the like. Exemplary quality metrics may include optimization of a work vehicle footprint, such as reducing an amount of work area traversed or an amount of a particular portion of the work area traversed for at least a current planned movement path, and/or optimization of work coverage by the work vehicle or a plurality of work vehicles including the work vehicle, such as maximizing an amount of at least a portion of the work area to be traversed with a minimal number of work vehicle passes/turns. Optimization routines may in various embodiments further account for various current work vehicle operating characteristics and conditions, cost parameters, time parameters, operator parameters, and the like.

In an embodiment, the modified planned movement path may be generated further in view of a monitored work coverage by the work vehicle 100, alone or optionally in combination with one or more additional work vehicles. A coverage monitor may be implemented, as part of the vehicle controller 112 or as a discrete module, to determine where the work vehicle 100 and/or any implement, such as a front implement on a combine or a towed planter by a tractor, has covered as the implement travels through the work area 300. Vehicle controller 112 may be configured to collect location data on one or more points in the work area, such as for collecting and storing GPS coordinates from a GPS receiver with differential correction as the work vehicle 100 traverses the work area.

In an embodiment, generation and implementation of a modified planned movement path by a first work vehicle 100 as disclosed herein may further be accompanied by communication of the modified planned movement path or various aspects thereof to one or more other work vehicles associated with the work area 300 or a central communications hub with respect thereto, for example to facilitate routing of any additional work vehicles to avoid duplicative traversal of the work area, to facilitate generation of subsequent modified planned movement paths for work vehicles travelling along parallel or otherwise proximate current planned movement paths, to inform the work vehicles of the region of interest and coverage characteristics, and the like. In certain embodiments, a corresponding nature of planned movement paths for a plurality of work vehicles working in the same work area may further influence the generation of a modified planned movement path for any one or more of the work vehicles, as for example the modified planned movement path may be generated to avoid overlap or otherwise interference with planned movement paths associated with any of the other work vehicles in the work area.

In an embodiment, with illustrative reference to FIGS. 3A-3D, the method 200 may dynamically modify the planned movement paths of one or more work vehicles with respect to a wet spot 310 within the work area 300.

Figure 3A:
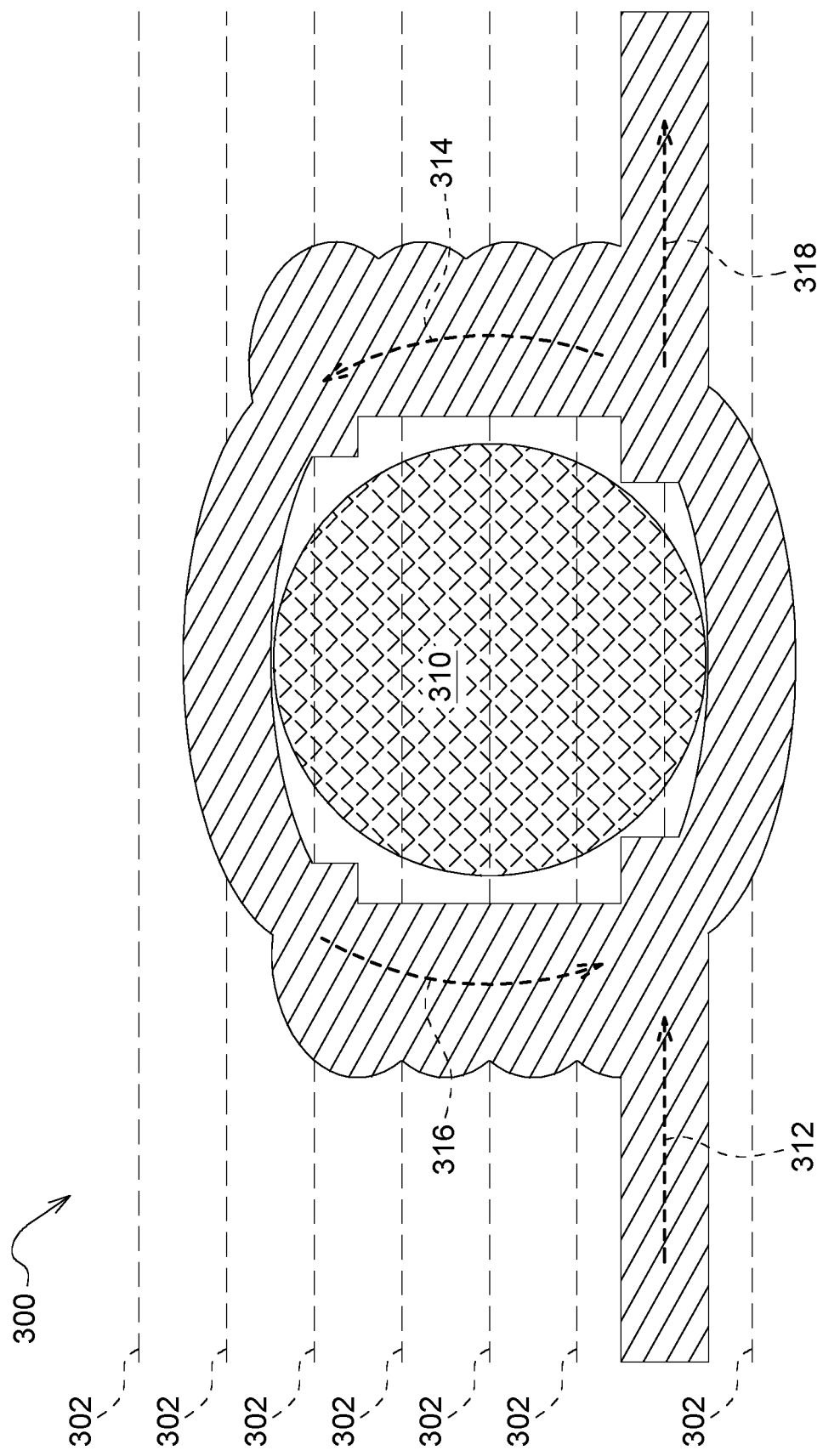
FIGS. 3A-3D are graphical diagrams representing an exemplary avoidance scenario wherein a region of interest is a wet spot in the work area being negotiated by one or more work vehicles.
Figure 4B:
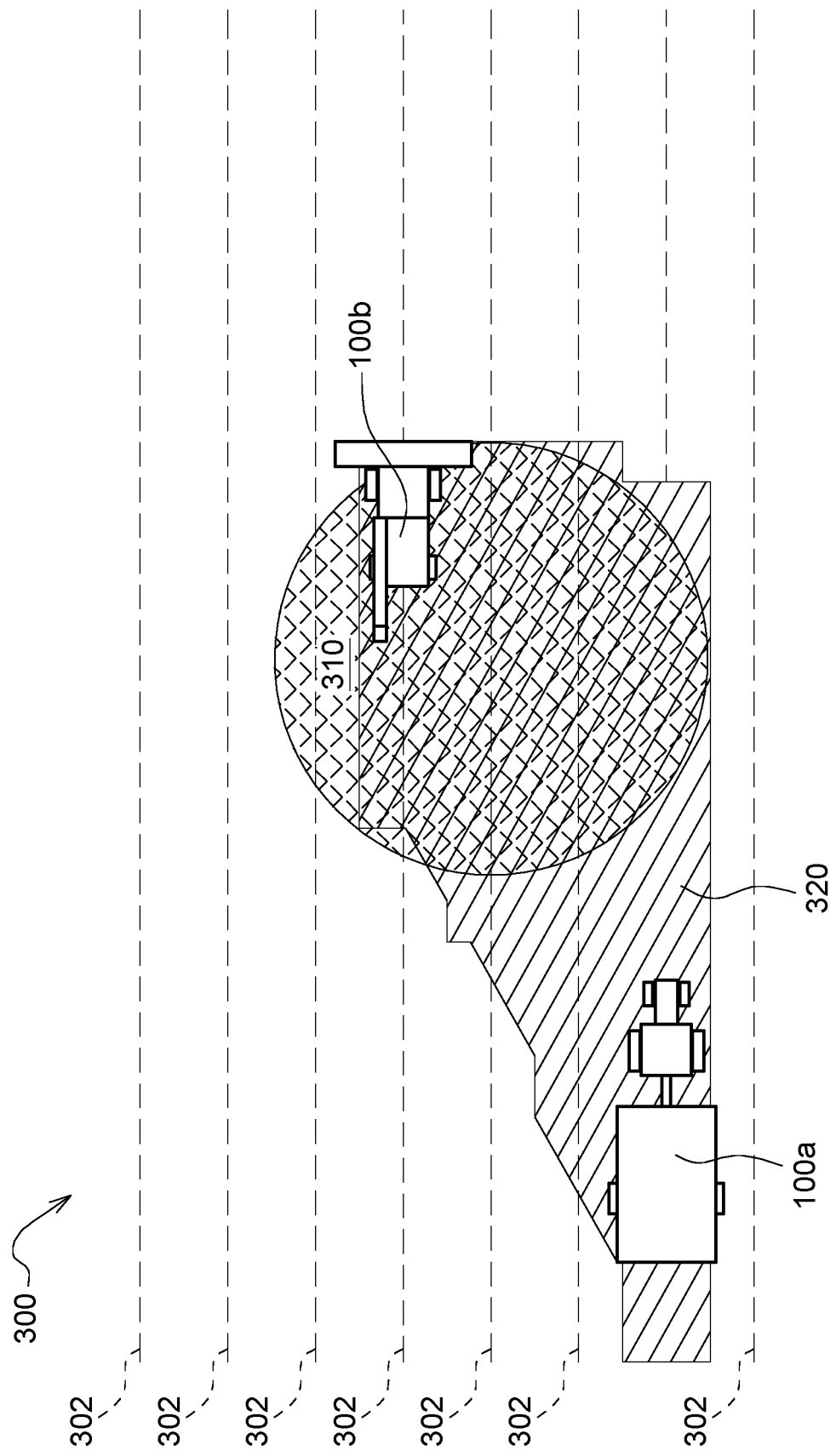
Figure 4D:
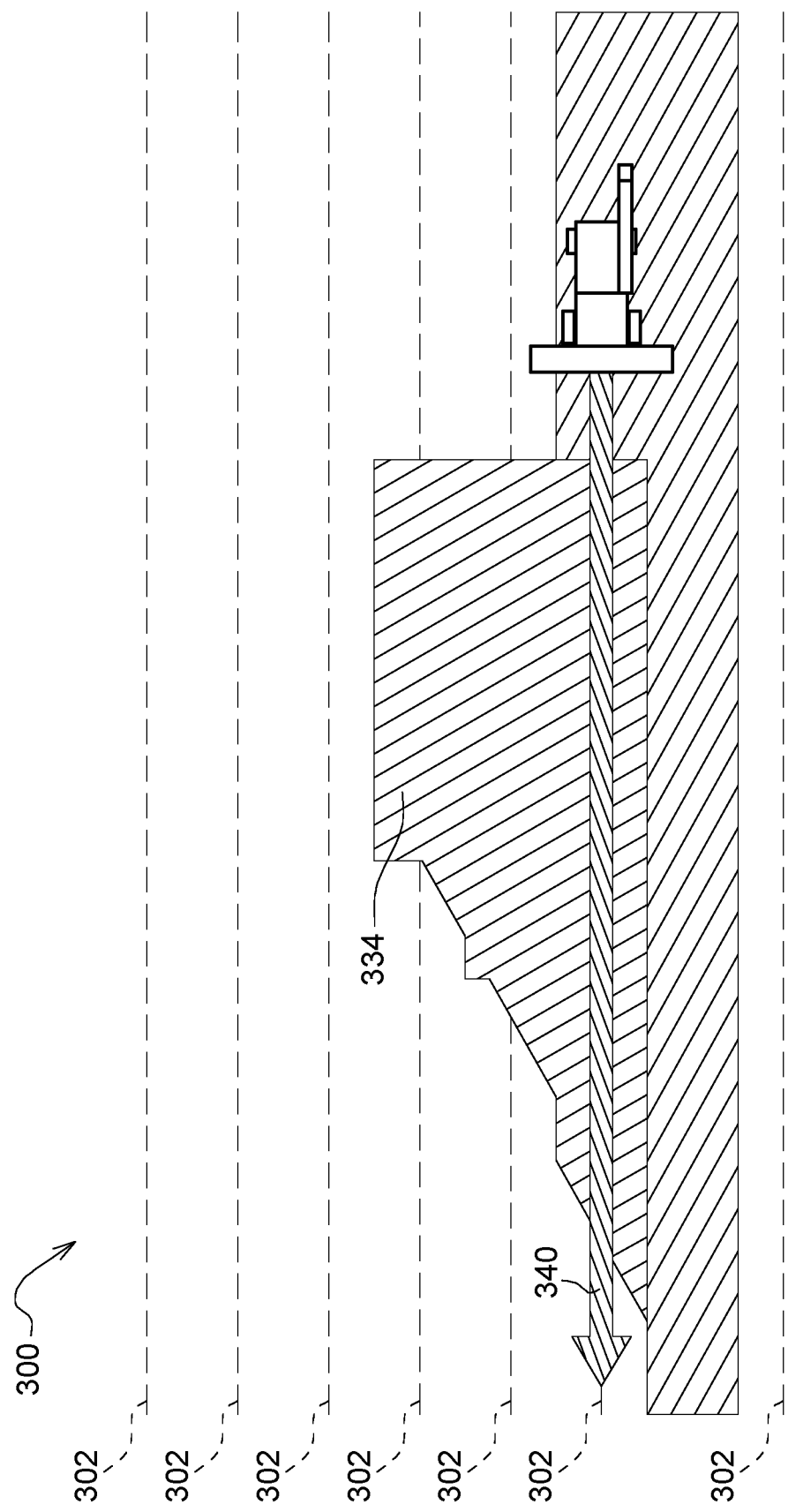

As shown in FIG. 3A, an exemplary initial planned movement path for a work vehicle along a first row 302 traverses the work area 300 from left to right, but an actual monitored movement path of the work vehicle routes around the wet spot 310 via trajectories 314 and 316 and to a final trajectory 318 which resumes the original track coincident with the initial movement path 312 and along the first row 302.

Figure 3B:
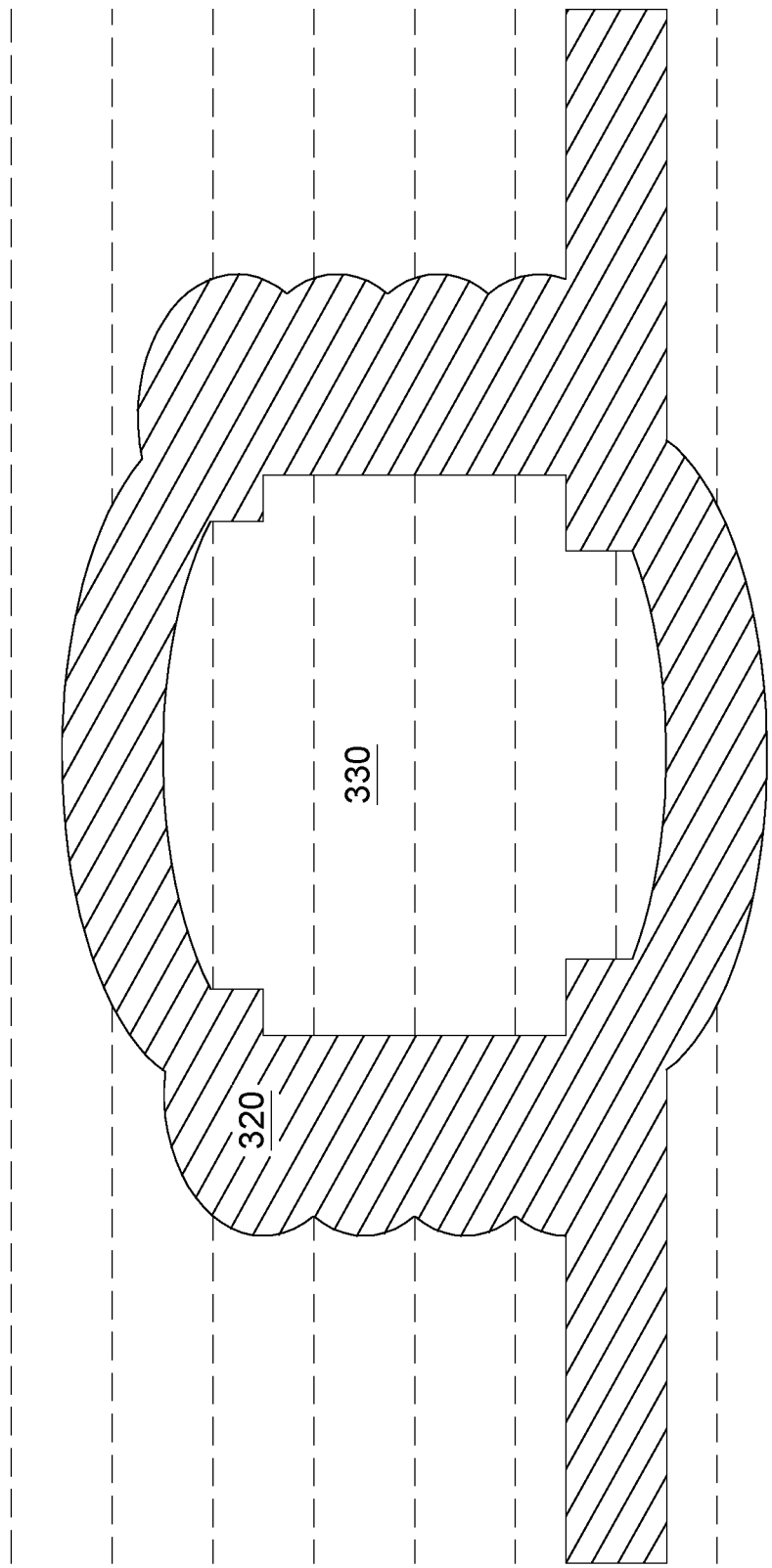
Figure 3C:
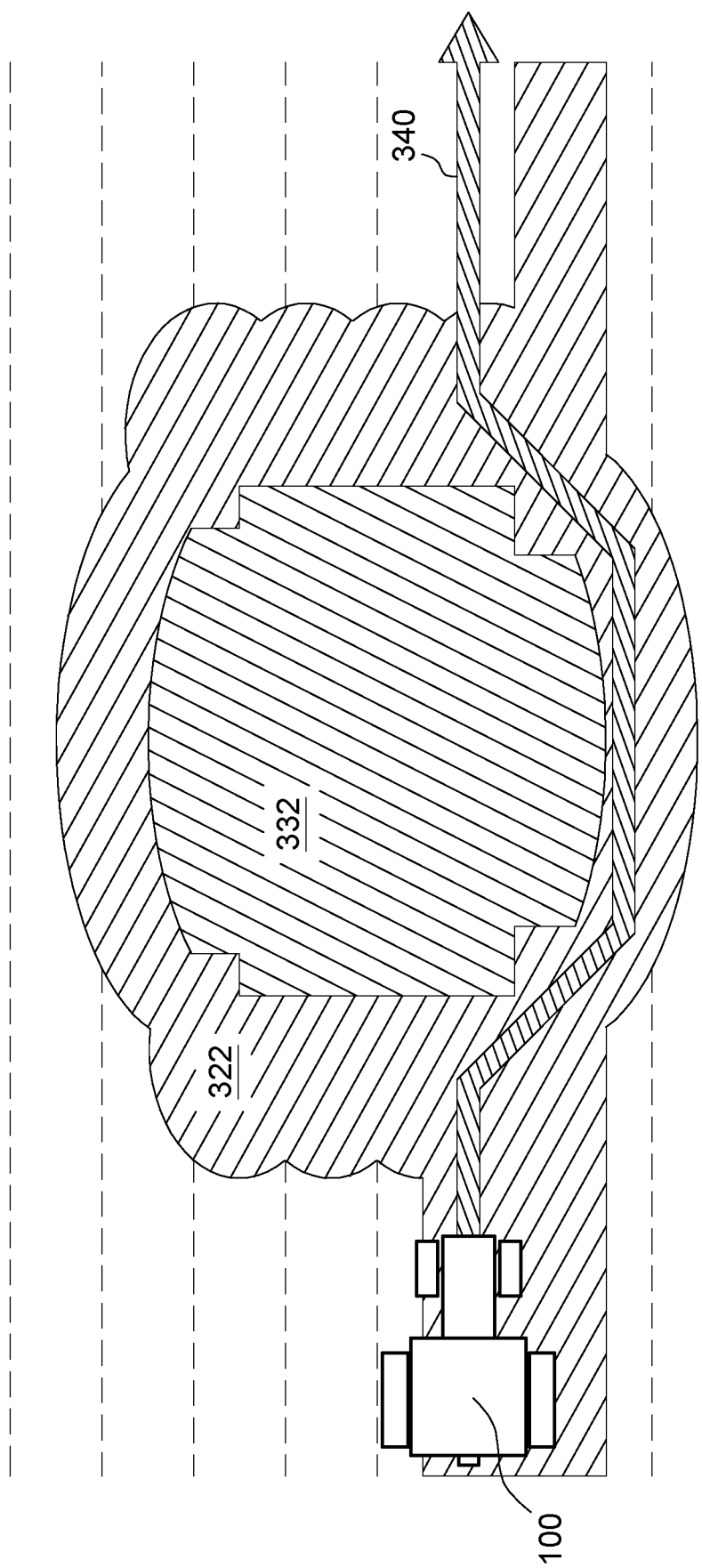

As shown in FIG. 3B, the observed movements 312, 314, 316, 318 about the wet spot 310 define a boundary coverage area 320 about a region of interest 330 which is identified by the system, without specifically identifying that the region of interest 330 is or includes a wet spot 310 otherwise using sensors or user input at this stage. However, in view of the configuration of the route 312, 314, 316, 318, alone or further in view of learned correlations or subsequently obtained inputs from a user, work vehicle sensors, or the like, the system may define the region of interest 330 as a non-traversable (i.e., "keep out") region of interest 332 having a traversable boundary coverage area 322 (as shown in FIG. 3C).

Figure 3D:
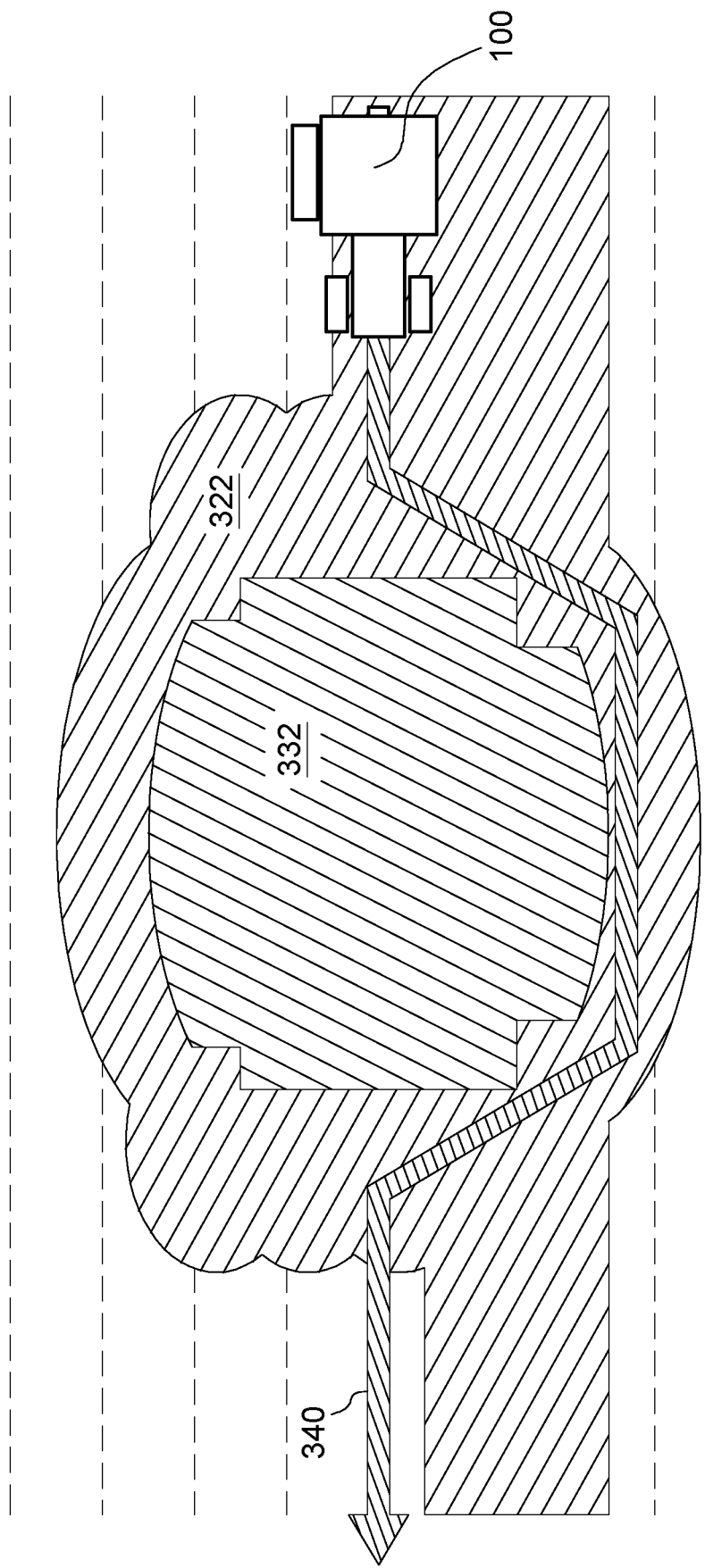

Accordingly, modified planned movement paths for the work vehicle 100 and/or other work vehicles traversing the work area 300 may include turning at or within the traversable boundary coverage 322 to prevent passing through the wet spot 310. For example, as shown in FIG. 3D, a work vehicle 100 subsequently approaching the wet spot 310 from right to left along an adjacent (e.g., second) row 302 is directed through the boundary coverage 322 and around the non-traversable region of interest 332 in view of a modified planned movement path 340 or, in some cases, a temporary detour from the original planned movement path comprising an executed turn sequence merely for evasion/avoidance of the wet spot 310.

In an embodiment, the system and method may determine a persistence status of the region of interest. For example, in some cases the wet spot 310 may effectively be persistent for the purposes of a given work cycle, wherein the wet spot 310 consistently is associated with a non-traversable region of interest 332. In other cases, the wet spot 310 may be determined as temporary, wherein the status of the region of interest 330 may be updated over time to allow for selective traverse of the region of interest 330.

In an embodiment, the system and method may further enable or selectively implement planned movement sequences from or associated with a mapped area (e.g., coverage or boundary) to be different than other planned movement sequences, recognizing coverage characteristics of the same as an input for generation of the planned movement sequences, for example alone or further in combination with work vehicle characteristics, a work cycle for the work area, work area conditions, a number of work vehicles, etc.

For example, the system may identify traversable coverage from a waterway to selectively drive through. Initially, the system identifies which coverage pass to turn on (or selectively default to a straight pass through) and incorporates such changes to a planned movement path and corresponding user interface where relevant. Where user input is selectively enabled via the user interface for identifying traversable coverage or generating a movement path with respect thereto, the system may limit the selectable options, for example wherein actions may only be performed with respect to first and last coverages associated with the waterway. The system may further enable or otherwise selectively implement changes to sequences or work vehicle speed, in similar fashion to the preceding embodiment and depending for example on one or more identified coverage characteristics. Mapped features may be labeled or otherwise classified based on coverage characteristics, for example to identify specific points along a continuous piece of coverage so that a defined "straight" path does not generate turns and further (for example depending on the identified characteristics) may or may not generate sequences and/or speed changes through the waterway.

In addition to movements of the work vehicle in traversing the work area, actions of a work implement attached to the work vehicle may be accounted for in current and modified plans, for example causing a combine work implement to be raised and turned off at the end of a field versus just raising the work implement/header for an identified waterway.

In an embodiment, with illustrative reference to FIGS. 4A-4D, the method 200 may dynamically modify the planned movement paths of one or more work vehicles with respect to a tendering/unloading area 310 within the work area 300.

As opposed to the non-traversable region of interest 332 identified in the embodiment above (and illustrated in FIGS. 3A-3D), monitoring of work vehicle movements in the present embodiment (illustrated in FIGS. 4A-4D) results in identification of a traversable region of interest 334, which may for example be labeled as a temporary unloading area, a waterway, a previously non-traversable region of interest with a non-persistent status, etc. Such identification may be made entirely based on a sequence of monitored work vehicle movements by one or more work vehicles 100a, 100b through or otherwise respect to the traversable region of interest 334, based for example on a shape of the work area corresponding to the movement sequence. Such identification may further be made based at least in part on an algorithm which identifies a shape of objects such as equipment in the area, a time, a proximity of other equipment, equipment functions, etc.

Such identification may further or alternatively be based at least in part on user input associated with the region of interest for that purpose, such as for example a user-specified flag/tag to label the region of interest via a user interface map function, and/or to label a coverage characteristic thereof such as for example a persistence status. Flags may be used by the system to assist with classification, for example flags may be read to infer characteristics of a region of interest, or flags may be generated to label characteristics of the region of interest (e.g., traversable, staging area, etc.).

In various embodiments as disclosed herein, coverage characteristics for a region of interest may be used to assist with classification directly, or otherwise indirectly based for example on learned correlations between one or more characteristics and the classification at issue. Waterways may for example be distinguishable from other regions of interest and identified based on a minimum width, by or pursuant to a number of work vehicle passes, and the like.

Based on the label applied to the region of interest 330, for example identifying a traversable region of interest 334 having associated coverage characteristics, the system may accordingly enable modifications to planned movement paths 340, again for example relating to path sequences and/or work vehicle speeds. In various embodiments, the system may vary or otherwise maintain the order in which tracks/rows 302 are traversed, further in view of an algorithm/model for optimizing coverage of the work area 300 based on planned movement paths for one or more work vehicles 100 traversing the work area and based at least in part on the identified regions of interest 330 and corresponding coverage characteristics. For example, in scenarios including multiple work vehicles (manned or autonomous), it may be desirable to update the track order when the "next track" in a current planned movement path is otherwise accounted for as having already been worked, currently being worked, or reserved to be worked by another work vehicle.

In an embodiment, for example as a particular use case for the preceding embodiment and with illustrative reference to FIGS. 5A-5E, the system and method 200 may dynamically modify the planned movement paths of one or more work vehicles 100 with respect to a staging area 336 of the work area 300, for example a boundary portion of an open field for work vehicles to get off of an adjacent road during harvest time. The system may observe work vehicles 100 and other equipment within the region of interest, for example based on the movements of the work vehicles as noted throughout, further potentially in view of inputs from perception systems (e.g., cameras, ultrasonic sensors, lidar sensors, etc.), telematics systems, in-field data sharing, and the like.

Different guidance behavior may generally be preferable in a field staging area as compared to other traversable regions of interest 334 such as the above-referenced tendering area, and coverage characteristics accordingly identified and implemented for that purpose.

For example, as illustrated in FIG. 5B, a coverage characteristic for the staging area may enable or otherwise flag or trigger a turn requirement at boundary coverage which would result in a planned movement path 340 preventing the work vehicle from passing through the staging area 336, but instead turning to a next track/row 302.

Figure 5C:
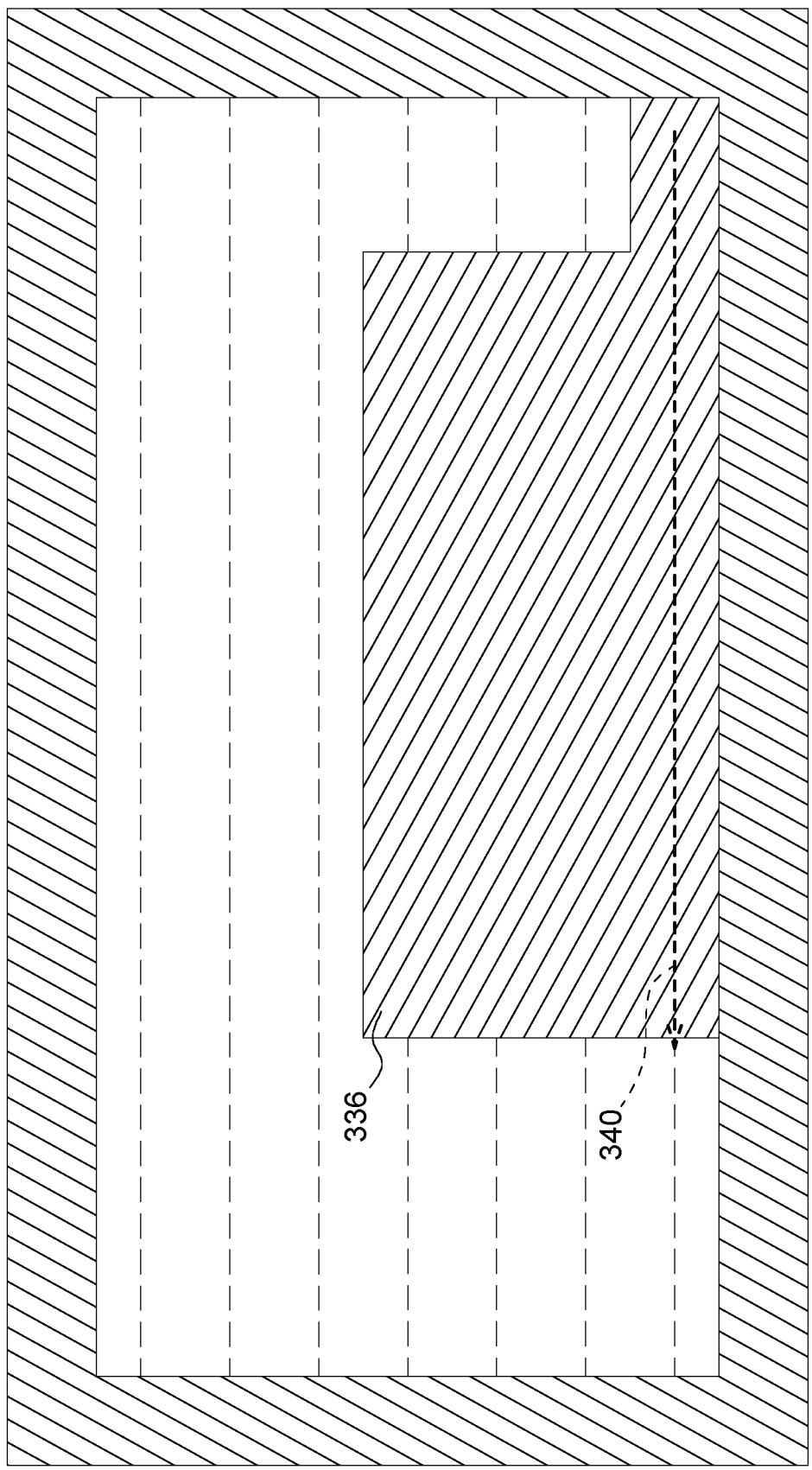

In another example as illustrated in FIG. 5C, a coverage characteristic for the region of interest may enable or otherwise flag or trigger a straight through requirement (or option) for planned movement paths 340 through a cleared staging area, e.g., "follow the headland."

Figure 5D:
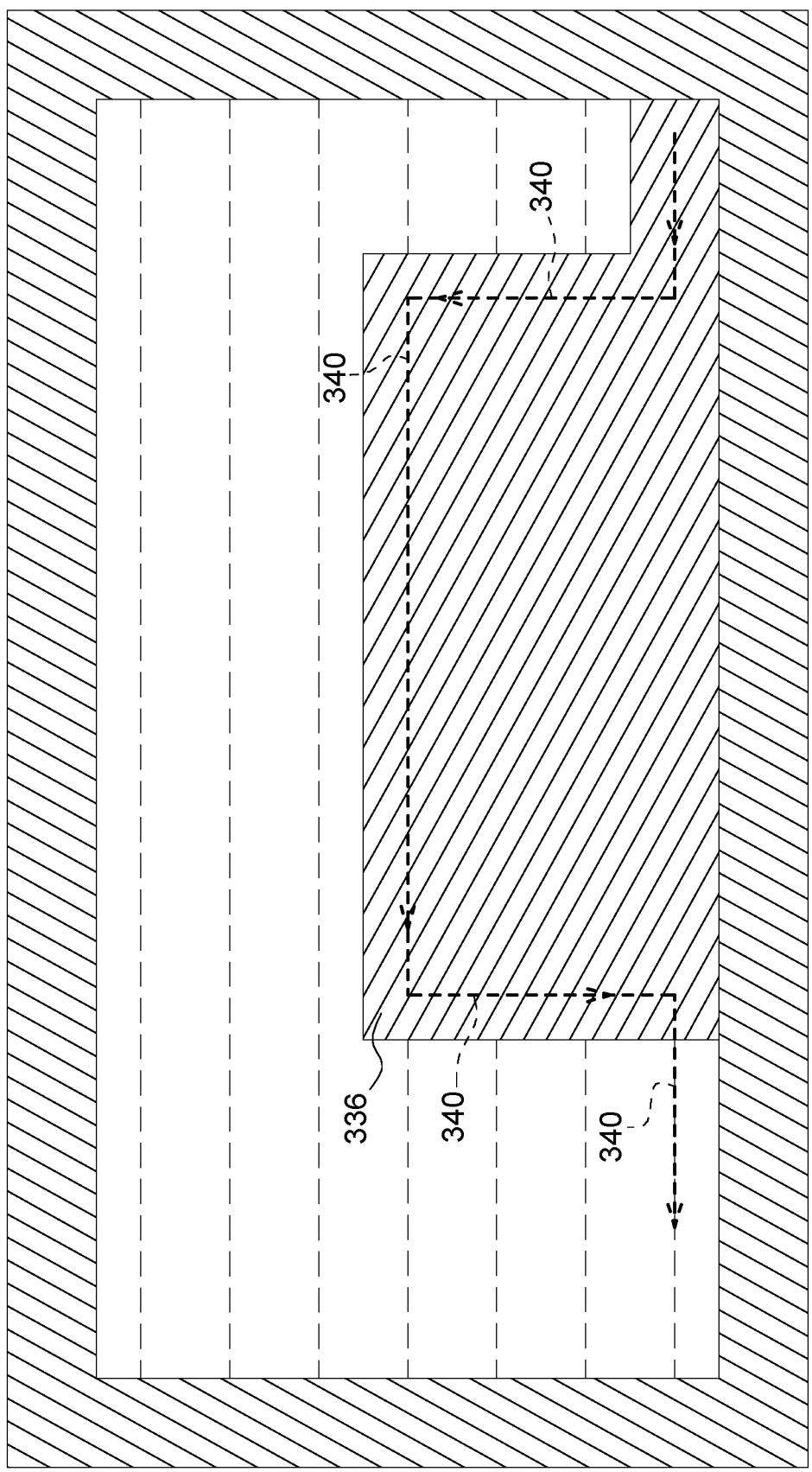

In another example as illustrated in FIG. 5D, a coverage characteristic for the region of interest may enable or otherwise flag or trigger an edge following requirement for planned movement paths 340 associated therewith, or in other words wherein work vehicles 100 are required to travel the perimeter (follow the headland) of the coverage, for example if equipment is known to be in the staging area 336.

Figure 5E:
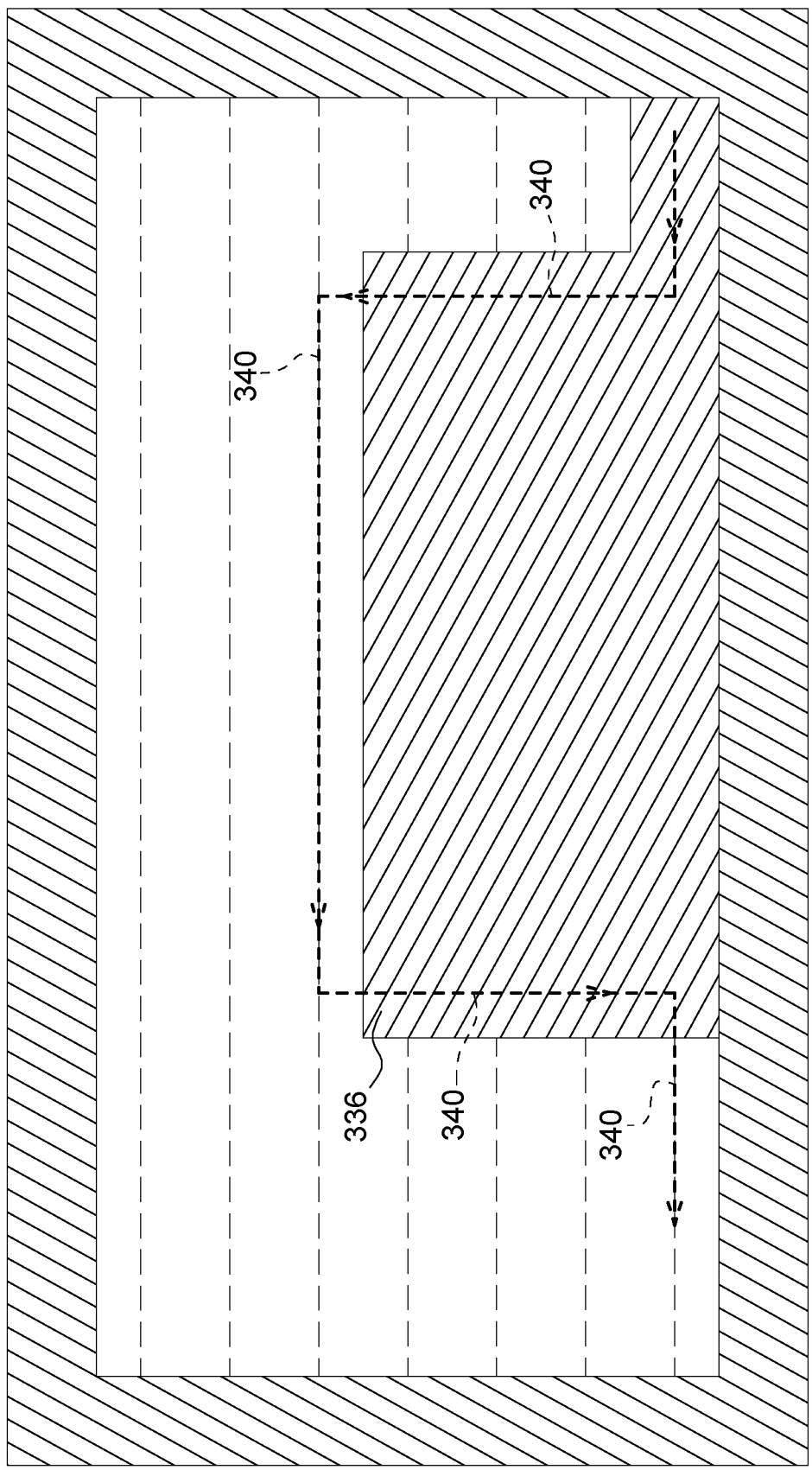

Similar to the example illustrated in FIG. 5D, in another example as illustrated in FIG. 5E, a coverage characteristic for the region of interest including or otherwise corresponding to a headland-following requirement (or option) may enable or otherwise require a planned movement path 340 which travels just outside of at least a portion of the staging area 336. Such a version of the headland-following planned movement path may be enabled based at least in part on the identified region of interest 330 and corresponding coverage characteristics, and further selectively implemented based on user input and/or an algorithm/model for optimizing work area coverage, for example in view of opportunistic harvest coverage possibilities.

As with other embodiments, based on the label applied to the staging area 336 and associated coverage characteristics, the system may accordingly enable modifications to planned movement paths 340, again for example relating to path sequences and/or work vehicle speeds. In various embodiments, the system may vary or otherwise maintain the order in which tracks/rows 302 are traversed, further in view of an algorithm/model for optimizing coverage of the work area 300 based on planned movement paths for one or more work vehicles 100 traversing the work area and based at least in part on the identified regions of interest 330 and corresponding coverage characteristics.

In various embodiments as described herein, functions such as identification of regions of interest, identification of associated coverage characteristics, and generation of planned movement paths, as well as work vehicle actions based thereon, may substantially be performed or otherwise controlled automatically. In other embodiments, the system may only selectively perform some of the above-referenced functions in automated fashion, while retaining operator control of other functions. In such embodiments, the system may dynamically modify a user interface by which such functions are implemented, such as for example to disable some functions based on a modified planned movement path or identified coverage characteristics for a region of interest. The system may dynamically modify the user interface to remove some functions and replace them with other functions, for example changing a "straight" icon function to a "skip turn" icon function, based on a modified planned movement path or identified coverage characteristics for a region of interest.

In accordance with embodiments as disclosed herein, modified planned movement paths as previously noted may be generated to optimize job performance via at least efficient working traverse/coverage of the work area for one or more work vehicles. Further enhanced work vehicle guidance capabilities may include achieving tighter turns within the available/recorded coverage area, and potentially improving operator comfort, improving job quality by maintaining constant speed on hills (e.g., maintain robust control over a wide range of implement forces), improving guidance performance and equipment stability on uneven terrain, and the like. These features may be provided by for example reducing equipment turn radius by selectively applying additional control effort to ground engaging units (wheels, tracks) of the work vehicle, using active braking, independent left/right brake engagement, and the like.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A computer-implemented method for automatically conforming guidance of work vehicles to detected conditions in a work area, the method comprising:

determining a deviation of a current position of a work vehicle along a current movement path of the work vehicle from a predicted position of the work vehicle along a first planned movement path of the work vehicle with respect to the work area;

identifying at least a portion of the work area as a region of interest, and one or more coverage characteristics associated with the region of interest, based at least in part on the determined deviation;

generating a second planned movement path for the work vehicle and/or a second work vehicle subsequently traversing the work area relative to the region of interest, wherein the generated second planned movement path accounts for the one or more coverage characteristics associated with the region of interest; and generating a vehicle controller output signal based on the generated second planned movement path for the work vehicle and/or the second work vehicle subsequently traversing the work area, autonomously maneuvering the work vehicle and/or the second work vehicle along the second planned movement path.

2. The method of claim 1, wherein:

the one or more coverage characteristics comprise a persistence status associated with the region of interest; and the generating of the second planned movement path comprises altering or maintaining the first planned movement path with respect to part or all of the region of interest based on the persistence status.

3. The method of claim 2, wherein the persistence status is determined based at least in part on previously monitored traverse of the region of interest as distinguished from the determined deviation of the current movement path, and further based at least in part on user input received via a user interface subsequent to the determined deviation.

4. The method of claim 1, wherein the second planned movement path is generated to guide the respective work vehicle to avoid further traverse with respect to monitored work vehicle coverage of the work area.

5. The method of claim 4, wherein the second planned movement path is generated to further guide the respective work vehicle to optimize work vehicle turns in view of turning capabilities for a type of work vehicle and a remaining coverage of the work area.

6. The method of claim 1, wherein the second planned movement path is generated to guide the respective work vehicle at least in part for parallel traverse with respect to previous movement paths about or through the region of interest.

7. The method of claim 1, wherein the region of interest and/or the one or more coverage characteristics are identified further based at least in part on one or more previously monitored movement paths relative to the at least portion of the work area.

8. The method of claim 1, wherein the region of interest and/or the one or more coverage characteristics are identified further based at least in part on user input received via a user interface subsequent to the determined deviation.

9. The method of claim 1, wherein the region of interest and/or the one or more coverage characteristics are identified further based at least in part on one or more previously monitored movement paths relative to the at least portion of the work area, and/or on user input received via a user interface subsequent to the determined deviation.

10. The method of claim 1, wherein the vehicle controller output signal is a control signal configured to control one or more of a steering unit, an engine speed control unit, or an implement control unit, and drives the work vehicle and/or the second work vehicle along the second planned movement path.

11. A system comprising one or more processors configured to direct the performance of operations for automatically conforming guidance of one or more work vehicles to detected conditions in a work area, the one or more processors configured to:

determine a deviation of a current position of a work vehicle along a current movement path of the work vehicle, as determined based at least in part from input signals generated from the work vehicle, from a predicted position of the work vehicle along a first planned movement path of the work vehicle with respect to the work area, as retrieved from data storage in functional communication with the one or more processors;

identify at least a portion of the work area as a region of interest, and one or more coverage characteristics associated with the region of interest, based at least in part on the determined deviation;

generate a second planned movement path for the work vehicle and/or a second work vehicle subsequently traversing the work area relative to the region of interest, wherein the generated second planned movement path accounts for the one or more coverage characteristics associated with the region of interest; and generate a vehicle controller output signal based on the generated second planned movement path for the work vehicle and/or the second work vehicle subsequently traversing the work area, autonomously maneuvering the work vehicle and/or the second work vehicle along the second planned movement path.

12. The system of claim 11, wherein:

the one or more coverage characteristics comprise a persistence status associated with the region of interest; and the generating of the second planned movement path comprises altering or maintaining the first planned movement path with respect to part or all of the region of interest based on the persistence status.

13. The system of claim 12, wherein the persistence status is determined based at least in part on previously monitored traverse of the region of interest as distinguished from the determined deviation of the current movement path, and further based at least in part on user input received via a user interface subsequent to the determined deviation.

14. The system of claim 11, wherein the second planned movement path is generated to guide the respective work vehicle with respect to one or more of:

avoiding further traverse with respect to the region of interest;

avoiding further traverse with respect to monitored work vehicle coverage of the work area;

optimizing work vehicle turns in view of turning capabilities for a type of work vehicle and a remaining coverage of the work area;

avoiding turns within the region of interest;

parallel traverse with respect to previous movement paths about or through the region of interest.

15. The system of claim 11, wherein the vehicle controller output signal is a control signal configured to control one or more of a steering unit, an engine speed control unit, or an implement control unit, and drives the work vehicle and/or the second work vehicle along the second planned movement path.

16. A self-propelled work vehicle comprising:

one or more sensors configured to generate output signals representing a current movement path of the work vehicle; and one or more processors configured to monitor the current movement path of the work vehicle based at least in part on the output signals, determine a deviation of the current position of a work vehicle along a current movement path of the work vehicle from a predicted position of the work vehicle along a first planned movement path of the work vehicle with respect to a work area, as retrieved from data storage in functional communication with the one or more processors, identify at least a portion of the work area as a region of interest, and one or more coverage characteristics associated with the region of interest, based at least in part on the determined deviation, generate a second planned movement path for the work vehicle and/or a second work vehicle subsequently traversing the work area relative to the region of interest, wherein the generated second planned movement path accounts for the one or more coverage characteristics associated with the region of interest; and transmit a vehicle controller output signal based on the generated second planned movement path for the work vehicle and/or the second work vehicle subsequently traversing the work area, for autonomously maneuvering the work vehicle and/or the second work vehicle along the second planned movement path.

17. The work vehicle of claim 16, wherein:

the one or more coverage characteristics comprise a persistence status associated with the region of interest;

wherein the persistence status is determined based at least in part on previously monitored traverse of the region of interest as distinguished from the determined deviation of the current movement path, and further based at least in part on user input received via a user interface subsequent to the determined deviation; and the generating of the second planned movement path comprises altering or maintaining the first planned movement path with respect to part or all of the region of interest based on the persistence status.

18. The work vehicle of claim 16, wherein the second planned movement path is generated to guide the respective work vehicle with respect to one or more of:

avoiding further traverse with respect to the region of interest;

avoiding further traverse with respect to monitored work vehicle coverage of the work area;

optimizing work vehicle turns in view of turning capabilities for a type of work vehicle and a remaining coverage of the work area;

avoiding turns within the region of interest;

parallel traverse with respect to previous movement paths about or through the region of interest.

19. The work vehicle of claim 16, wherein the region of interest and/or the one or more coverage characteristics are identified further based at least in part on one or more previously monitored movement paths relative to the at least portion of the work area, and/or on user input received via a user interface subsequent to the determined deviation.

20. The work vehicle of claim 16, wherein at least one of the one or more processors is associated with a vehicle controller.

* * * * *